US012311381B2

(12) United States Patent
Mounier et al.

(10) Patent No.: US 12,311,381 B2
(45) Date of Patent: May 27, 2025

(54) APPARATUS AND METHOD FOR RECOVERING PRECIOUS METALS, SUCH AS PLATINUM, RHODIUM, GOLD, SILVER, ETC., FROM CONTAMINATED CEMENT

(71) Applicant: Dietze & Schell Maschinenfabrik GmbH & Co. KG, Coburg (DE)

(72) Inventors: Marc Mounier, Le Touvet (FR); Andrea Colombo, Costamasnaga (IT); Alberto Fabbris, Verbania (IT)

(73) Assignee: Dietze & Schell Maschinenfabrik GmbH & Co. KG, Coburg (DE)

( * ) Notice: Subject to any disclaimer, the term of this patent is extended or adjusted under 35 U.S.C. 154(b) by 405 days.

(21) Appl. No.: 17/650,081

(22) Filed: Feb. 6, 2022

(65) Prior Publication Data
US 2022/0250085 A1 Aug. 11, 2022

(30) Foreign Application Priority Data
Feb. 9, 2021 (IT) .................. 102021000002831

(51) Int. Cl.
*B03B 9/06* (2006.01)
*B02C 13/284* (2006.01)
(Continued)

(52) U.S. Cl.
CPC ............ *B03B 9/061* (2013.01); *B02C 13/284* (2013.01); *B03B 7/00* (2013.01); *B02C 2013/28654* (2013.01); *B02C 2201/02* (2013.01)

(58) Field of Classification Search
CPC ......... B03B 9/061; B03B 7/00; B02C 13/284; B02C 2013/28654; B02C 2201/02
See application file for complete search history.

(56) References Cited

U.S. PATENT DOCUMENTS 3,086,718 A    8/1963    Lukas, Jr.
4,571,263 A *   2/1986    Weir ..................... C22B 11/04
                                                                         205/571
(Continued)

FOREIGN PATENT DOCUMENTS

JP        H06 205993 A     7/1994
JP        2018 119216 A    8/2018
(Continued)

OTHER PUBLICATIONS

ISR; The Hague; Oct. 20, 2021.

*Primary Examiner* — Michael McCullough
*Assistant Examiner* — Kalyanavenkateshware Kumar
(74) *Attorney, Agent, or Firm* — Posz Law Group, PLC

(57) ABSTRACT

Apparatus and method for recovering precious metals from contaminated cement, comprising, in order of process, a crusher, in which a cement-metal conglomerate is placed, a sieve, a dispenser, a first container, suitable for collecting the metal on the bottom through the action of a magnetic stirrer, an expander, a second container, a drainage tank, and a sieve. The present invention relates in particular to the recovery of precious metal from the batch of cement contaminated by precious metals, such as platinum, rhodium, gold, or silver. In the production of glass fibers for reinforcement, dies made of an alloy of precious metals, in particular platinum and rhodium, are used. These dies are supported by a special cement structure. During the months of production life of the die, part of the precious metal diffuses into the cement on account of the high temperatures. Given the value of the metals, it is economically advantageous to recover them from the supporting cement at each change of the die.

12 Claims, 1 Drawing Sheet

(51) Int. Cl.
  *B03B 7/00*     (2006.01)
  *B02C 13/286*   (2006.01)

(56) References Cited

U.S. PATENT DOCUMENTS

| | | | |
|---|---|---|---|
| 5,158,238 A | 10/1992 | Lehman | |
| 2004/0258609 A1* | 12/2004 | Boren | B01J 20/06 |
| | | | 422/171 |
| 2011/0067569 A1* | 3/2011 | Valerio | B07B 7/04 |
| | | | 209/133 |
| 2019/0233917 A1* | 8/2019 | Nelson | C22B 11/042 |
| 2020/0108399 A1* | 4/2020 | Wen | C22B 7/005 |
| 2021/0079488 A1* | 3/2021 | McNeish | C21B 13/0006 |

FOREIGN PATENT DOCUMENTS

| | | | |
|---|---|---|---|
| WO | 9947714 A1 | 9/1999 | |
| WO | WO-2014093584 A1 * | 6/2014 | C22B 1/00 |

* cited by examiner

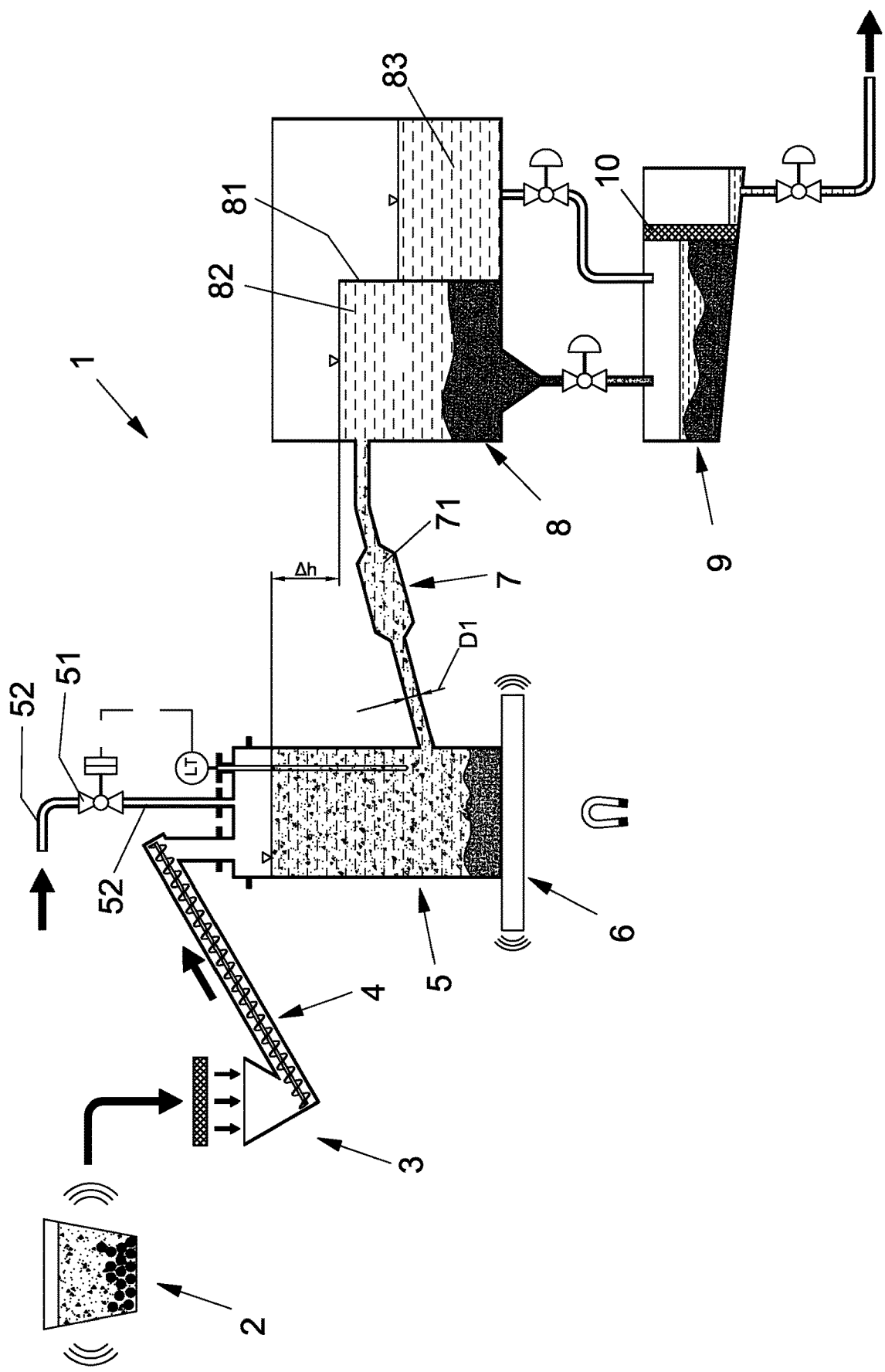

APPARATUS AND METHOD FOR RECOVERING PRECIOUS METALS, SUCH AS PLATINUM, RHODIUM, GOLD, SILVER, ETC., FROM CONTAMINATED CEMENT

BACKGROUND OF THE INVENTION

The present invention relates to an apparatus and a method for recovering precious metals, such as platinum, rhodium, gold, silver, etc., from contaminated cement.

The present invention relates in particular to a system for recovering precious metal from the cement support of dies.

As is known, in the production of glass fibers for reinforcement, dies made of an alloy of precious metals, such as platinum and rhodium, are used.

These dies are supported by a special cement structure.

During the production life of a die, which lasts a few months, part of the precious metal diffuses into the cement on account of the high temperatures.

Given the value of the metals, it is economically advantageous to recover these metals from the supporting cement at each change of the die.

Currently, chemical techniques are used for recovering precious metal, in any type of batch of cement.

A chemical attack is carried out, by means of acids, on the cement batch and the precious metal component is precipitated and can be recovered.

The type of acid depends on the type of precious metal to be recovered.

The traditional recovery process is rather expensive and time-consuming while, in addition, a percentage of the metal is lost.

Furthermore, where an alloy of precious metals is involved, the chemical process returns the metals in separate form and no longer as an alloy and the loss percentages are different for the different components, making it impossible to obtain the same alloy from the recovered metals.

Another drawback lies in the fact that this process requires specific plants and cannot be carried out everywhere.

Thus, there is a need to transport the cement with the precious metal, with all the related insurance and logistics problems and with times that decrease the productivity of the capital invested in the precious metal.

Another precious metal recovery system is based on the difference in density between cement and metal. The two components are separated by means of a centrifugation.

WO99/47714A1 describes a system for separating gold from a charge, according to the prior art. This system includes a grinding mill which passes a crushed charge through hydrocyclones, for separation into a light and dense fraction. The dense fraction is further concentrated by means of an in-line pressure jig and the concentrate is leached in a rotating leaching reactor. The resulting mixture is subjected to electrorefining to recover gold and the spent mass is recycled.

SUMMARY OF THE INVENTION

The aim of the present invention is to provide a plant that solves the technical problem of reducing the technological and logistical complexity of the prior art in the recovery of precious metals.

In connection with this aim, an object of the invention is to provide a plant that allows the precious material recovery times, currently very long with the known chemical systems, to be reduced.

Another object of the invention is to provide a plant that avoids the need to transport the material which, in addition to lengthening the times, generates a series of logistical problems and costs which are instead eliminated with the present system according to this invention, as it offers the possibility of carrying out the process directly in the factory.

Another object of the invention is to provide a plant that makes it possible to recover the alloy material and not the individual components, with the possibility of using the material directly for the construction of new dies.

Another object of the invention is to provide a plant that does not require the use of acids or chemical components and which is purely mechanical.

Another object of the invention is to provide a plant that offers simplicity of operation and savings in energy and water consumption.

A further object of the invention is to provide a plant that, due to its particular constructional characteristics, is capable of ensuring the most extensive guarantees of reliability and safety of use.

This and other objects, that will be better highlighted below, are attained through an apparatus and method for the recovery of precious metals from contaminated cement, as claimed in the appended claims.

BRIEF DESCRIPTION OF THE DRAWINGS

Further characteristics and advantages of this invention will be more apparent from an examination of the description of a preferred, though not exclusive, embodiment of the invention, illustrated by way of non-limiting example in the appended drawings, in which:

FIG. 1 is a schematic view of the apparatus according to the present invention.

DESCRIPTION OF THE PREFERRED EMBODIMENTS

With particular reference to the numerical symbols of the aforementioned FIGURE, the apparatus for recovering precious metals from contaminated cement, according to the invention, indicated as a whole with the reference number 1, comprises, in order of process, a crusher 2, in which a cement-metal conglomerate is placed, a sieve 3, a dispenser 4, a first container 5, suitable for collecting the metal on the bottom through the action of a magnetic stirrer 6, an expander 7, a second container 8, a drainage tank 9, and a sieve 10.

In the crusher 2, the cement-metal conglomerate, where the metal in this case is platinum, is inserted in a stirrer, together with cemented balls, to be crushed and pulverized.

The cement-platinum powder is passed through the sieve 3 to separate the powder from the pieces not completely crushed.

The filtered powder is collected in the hopper of the dispenser 4 which, by means of an auger conveyor, feeds the powder into the first container 5.

The cement-platinum powder and water are fed into the first container 5.

The water is kept at a predetermined level by means of a level sensor whose signal controls the opening and closing of an on/off valve 51 located in a pipe 52 at the container inlet, for topping up the water.

The water and the powder are mixed inside the first container 5 by the magnetic stirrer 6.

Having a higher specific weight than the cement, the platinum begins to deposit on the bottom of the first container 5.

The expander 7 comprises a tube having a diameter D1 which connects the first container 5 to the second container 8, consisting of a tank.

The flow is ensured by the difference in head Δh between the first container 5 and the second container 8, which also determines the transfer speed V1.

An expander element 71, positioned in the middle of the connecting tube, allows the flow speed to slow down to a value V2.

The circuit is designed in such a way as to have a value of V1 high enough to allow entrainment of platinum and cement.

The value of V2, determined by the diameter of the expander element 71, is such as not to allow entrainment of the platinum but sufficient to allow passage of the cement into the second container 8.

The platinum then falls, sliding, to the bottom of the first container 5.

The second container 8 is made up of two sectors, divided by a wall 81 which maintains the first sector 82 at a predetermined level, ensuring the difference in head with the first container 5.

The cement settles on the bottom of the first sector 82 while the second sector 83 has the function of draining off the water so that the level can be maintained.

The drainage tank 9, positioned below the second container 8, collects the wet cement.

The sieve 10 allows the water to pass through and be drained off.

The collected cement can optionally be dried and fed back into the circuit to improve the efficiency of the process.

It has been seen in practice that the invention accomplishes the intended aim and objects.

In fact, a plant has been provided that solves the technical problem of reducing the technological and logistical complexity of the prior the art in the recovery of precious metals.

The system of the present invention is based on the idea of exploiting the difference in density of the cement and the precious metal immersed in a water tank.

The batch is crushed in advance into fine particles and immersed in a water tank.

Water and the lighter particles are evacuated by a siphon current, that enables segregation by difference of density.

The precious metal is separated in the water tank.

The system according to the present invention differs from the prior art, for example from WO99/47714A1, by the synergistic action of the devices, such as the dispenser, the magnetic stirrer and the expander, which are all used, not as alternatives or auxiliaries to one another.

The system of the present invention offers several real technical advantages.

An advantage of the present invention is constituted by the reduced time to recover the precious material, unlike the very long times of traditional chemical systems.

The invention provides for the recovery to take place in the same factory where the cement is used for the production of glass fibers.

Another important problem solved by the present invention is the transport of the material which, in the traditional systems, in addition to lengthening times, generates a series of logistical problems and costs which are instead eliminated by this invention, with the possibility of carrying out the process directly in the factory.

Furthermore, the present invention allows the material to be recovered as an alloy and not in individual components, with the possibility of using the material again directly to make new dies.

No use is required of acids or chemical components. The treatment is purely mechanical.

The system of the present invention offers great simplicity of operation and also savings in energy and water consumption.

The invention does not use chemicals and is therefore much less dangerous.

Naturally the materials used, as well as the dimensions, may be adapted to meet any needs.

The invention claimed is:

1. An apparatus for recovering precious metals from contaminated cement, comprising, in order of process:
   a crusher, in which a cement-metal conglomerate is placed,
   a first sieve,
   a dispenser,
   a first container,
   an expander,
   a second container,
   a drainage tank, and
   a second sieve,
   wherein the first container is suitable for collecting the metal on the bottom through the action of a magnetic stirrer and collecting cement-containing liquid on the upper part of said first container,
   wherein the expander is provided for transferring said cement-containing liquid, and
   wherein said expander comprises a tube having a diameter; said tube connecting said first container to said second container; a flow being ensured by a difference in head between said first container and said second container, determining a transfer speed.

2. The apparatus according to claim 1, wherein said crusher comprises a stirrer and metal balls for crushing said cement-metal conglomerate and forming a cement-metal powder.

3. The apparatus according to claim 2, wherein
   said first sieve receives said cement-metal powder, and separates said powder from pieces not completely crushed;
   said dispenser comprises a hopper suitable for collecting said filtered powder; said dispenser feeds, by means of an auger conveyor, said powder into said first container.

4. The apparatus according to claim 3, wherein said first container is provided with a level sensor whose signal controls the opening and closing of an on/off valve placed in a pipe at the inlet of said first container.

5. The apparatus according to claim 1, wherein said expander comprises an expander element positioned in the middle of the tube, and the diameter of said expander element is embodied so as not to allow entrainment of the metal but to allow passage of the cement into said second container.

6. The apparatus according to claim 5, wherein said second container comprises two sectors, divided by a wall which maintains a first sector of the two sectors at a predetermined level, to ensure said difference in head with said first container.

7. The apparatus according to claim 6, wherein said drainage tank, positioned below said second container, collects the wet cement; said second sieve allowing the water to pass and be drained off.

8. A method for recovering precious metals from contaminated cement by means of the apparatus according to claim 1, wherein a powder of the cement-metal conglomerate is mixed with water inside the first container by means of the magnetic stirrer, in which the metal deposits on the bottom of said first container and the cement-containing liquid is transferred to the second container for separating the cement from water.

9. The method according to claim 8, wherein the flow of said cement-containing liquid through said expander is ensured by the difference in head between said first container and said second container, determining the transfer speed configured so as to be sufficiently high to allow the entrainment of metal and cement.

10. The method according to claim 9, wherein said expander element slows said flow from said transfer speed to a speed determined by the diameter of said expander element so as not to allow entrainment of the metal, but sufficient to allow passage of the cement into said second container, said metal falling, sliding to the bottom of said first container.

11. The method according to claim 8, wherein the level of the cement-containing water is maintained, in a first sector of the second container, at a predetermined level to ensure the difference in head with said first container, the cement depositing on the bottom of said first sector, while a second sector of the second container has the function of draining off the water so that the level can be maintained.

12. The method according to claim 8, wherein the cement collected in said second container is dried and fed back into the circuit to improve the efficiency of said method.

\* \* \* \* \*